United States Patent
Wu et al.

(10) Patent No.: US 11,091,661 B2
(45) Date of Patent: Aug. 17, 2021

(54) METHOD FOR PREPARING LARGE-AREA STRUCTURAL CHROMOGENIC PATTERN BY INK-JET PRINTING AND ANTI-COUNTERFEITING METHOD BASED ON STRUCTURAL COLOR CHANGE

(71) Applicant: DALIAN UNIVERSITY OF TECHNOLOGY, Liaoning (CN)

(72) Inventors: Suli Wu, Liaoning (CN); Jie Chang, Liaoning (CN); Baoqi Liu, Liaoning (CN); Shufen Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 88 days.

(21) Appl. No.: 16/494,665

(22) PCT Filed: Mar. 14, 2018

(86) PCT No.: PCT/CN2018/078942
§ 371 (c)(1),
(2) Date: Sep. 16, 2019

(87) PCT Pub. No.: WO2018/166465
PCT Pub. Date: Sep. 20, 2018

(65) Prior Publication Data
US 2020/0010703 A1  Jan. 9, 2020

(30) Foreign Application Priority Data

Mar. 15, 2017 (CN) .......................... 201710153541.1
Mar. 15, 2017 (CN) .......................... 201710155140.X

(51) Int. Cl.
*C09D 11/322* (2014.01)
*B41M 5/00* (2006.01)
(Continued)

(52) U.S. Cl.
CPC .......... *C09D 11/322* (2013.01); *B41J 2/2114* (2013.01); *B41M 5/0023* (2013.01);
(Continued)

(58) Field of Classification Search
CPC ............ B41J 2/01; B41J 2/211; B41J 2/1433; B41J 2/17; B41J 2/17593; B41J 2/2107;
(Continued)

(56) References Cited

U.S. PATENT DOCUMENTS

| 5,958,123 | A | * | 9/1999 | De La Fuente | ........ | C09D 11/14 |
| | | | | | | 106/31.69 |
| 2002/0016985 | A1 | * | 2/2002 | Kelleher | ................ | A41D 13/01 |
| | | | | | | 2/458 |

(Continued)

FOREIGN PATENT DOCUMENTS

| CN | 103788770 A | * | 5/2014 | ............. | C09D 11/30 |
| CN | 103788770 A | | 5/2014 | | |

(Continued)

OTHER PUBLICATIONS

ThermoFisher Scientific (Feb. 2, 2010) (Total pp. 7) Material Safety Data Sheet Ethylene Glycol Boiling point 196° C-198° C (p. 4). (Year: 2010).*

(Continued)

*Primary Examiner* — Manish S Shah
(74) *Attorney, Agent, or Firm* — Novick, Kim & Lee, PLLC; Allen Xue

(57) ABSTRACT

A method for preparing a large-area structural chromogenic pattern by ink-jet printing, a structural chromogenic pattern obtained by the method, and an anti-counterfeiting method based on a structural color change. A dispersion liquid containing mono-disperse colloidal microspheres with high index of refraction is printed onto a piece of paper by using an ink-jet printer, and nano-microspheres are arranged and (Continued)

assembled on the paper to obtain a micro-structure having the features of being ordered from a short distance and disordered from a long distance. A pretty structural color can be observed by means of the interaction of the structure with light, thus displaying a pattern, changing the angle of observation, changing the brightness of the structural color, and hiding and displaying the pattern. The method is simple and convenient, is widely applicable, and can achieve the preparation and anti-counterfeiting of a large-area structural color without external stimulation.

13 Claims, 3 Drawing Sheets

(51) Int. Cl.
C09D 11/033 (2014.01)
C09D 11/037 (2014.01)
C09D 11/106 (2014.01)
C09D 11/38 (2014.01)
D21H 19/38 (2006.01)
D21H 19/60 (2006.01)
D21H 21/48 (2006.01)
D21H 23/50 (2006.01)
B41J 2/21 (2006.01)

(52) U.S. Cl.
CPC .......... *C09D 11/033* (2013.01); *C09D 11/037* (2013.01); *C09D 11/106* (2013.01); *C09D 11/38* (2013.01); *D21H 19/38* (2013.01); *D21H 19/60* (2013.01); *D21H 21/48* (2013.01); *D21H 23/50* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04595; B41J 2/04586; B41J 2/14274; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2002/0128336 | A1* | 9/2002 | Kolb | C09J 11/04 |
| | | | | 521/50 |
| 2007/0196655 | A1* | 8/2007 | Schattka | C04B 20/1029 |
| | | | | 428/402.2 |
| 2011/0179974 | A1* | 7/2011 | Tateishi | C09D 11/322 |
| | | | | 106/496 |
| 2016/0039851 | A1* | 2/2016 | Muller | C09D 135/02 |
| | | | | 522/49 |

FOREIGN PATENT DOCUMENTS

| | | | |
|---|---|---|---|
| CN | 104044380 A | 9/2014 | |
| CN | 105017863 A | * 11/2015 | .......... C09D 11/102 |
| CN | 105017863 A | 11/2015 | |
| EP | 2204349 A1 | 7/2010 | |

OTHER PUBLICATIONS

Science Lab.com (Oct. 11, 2005) (Total pp. 5) Material Safety Data Sheet Diethylene Glycol Boiling point 245.8° C (p. 3) (Year: 2005).*
Cui, Liying et al "Fabrication of large-area patterned photonic crystals by ink-jet printing" Journal of Materials Chemistry, 2009, p. 5499-5502, vol. 19.
Yakovlev, Aleksandr V. et al., "Inkjet Color Printing by Interference Nanostructures" ACS NANO, 2016, p. 3078-3086, vol. 10, American Chemical Society.
Kuang, Minxuan et al. "Inkjet Printing Patterned Photonic Crystal Domes for Wide Viewing-Angle Displays by Controlling the Sliding Three Phase Contact Line" Advance Optical Materials, 2014, p. 34-38, vol. 2.
Ye, Siyun et al. "Invisible Photonic Prints Shown by Deformation", Advance Functional Materials, 2014, p. 6430-6438, vol. 24.
Hou, Jue et al. "Four-Dimensional Screening Anti-Counterfeiting Pattern by Inkjet Printed Photonic Crystals", Chemistry an Asian Journal Communication, Oct. 6, 2016, vol. 11, No. 19, pp. 2680-2685.

* cited by examiner

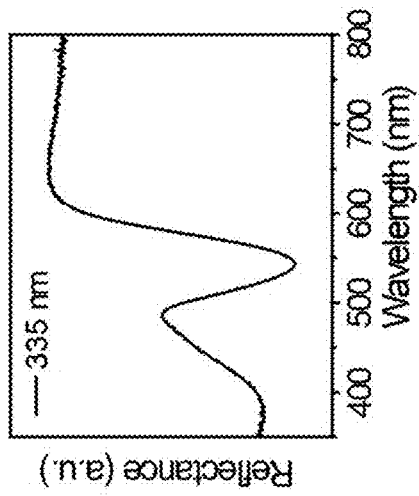
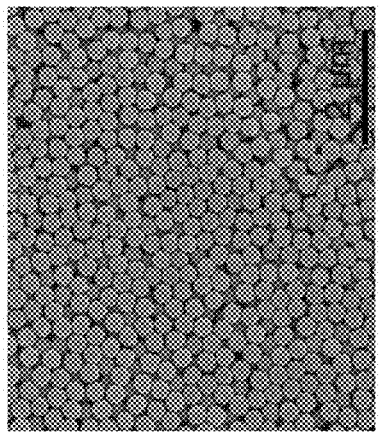
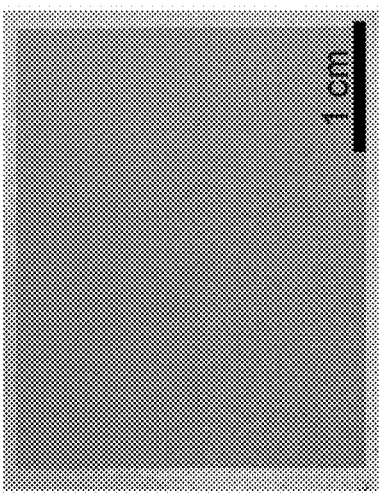
Fig. 1a  Fig. 1b  Fig. 1c
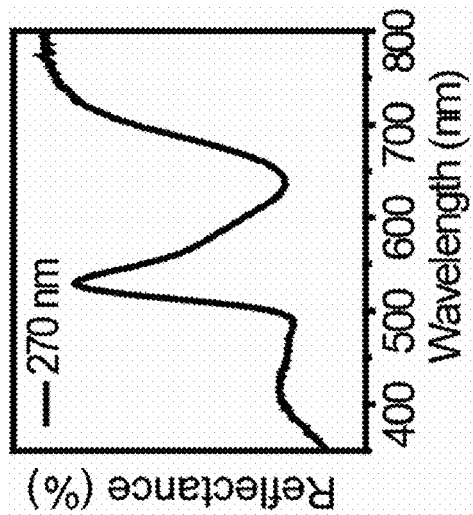
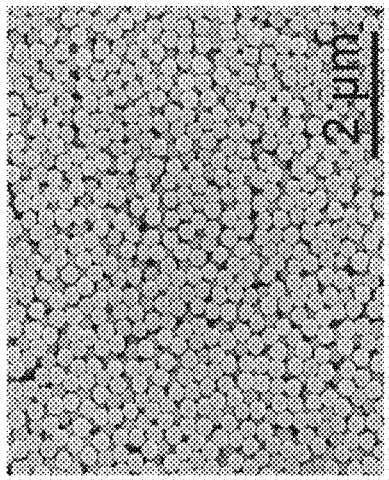
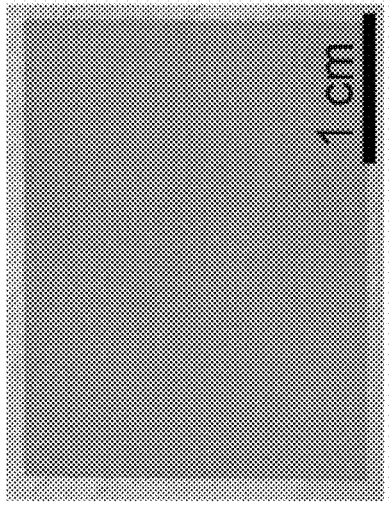
Fig. 2a  Fig. 2b  Fig. 2c

METHOD FOR PREPARING LARGE-AREA STRUCTURAL CHROMOGENIC PATTERN BY INK-JET PRINTING AND ANTI-COUNTERFEITING METHOD BASED ON STRUCTURAL COLOR CHANGE

TECHNICAL FIELD

The present invention belongs to the field of preparation of large-area structural color patterns and anti-counterfeiting, and in details relates to a method for obtaining a large-area structural chromogenic pattern on paper by using an ink-jet printing technology and an anti-counterfeiting method based on a structural color change.

BACKGROUND ART

A color effect caused by dispersion, refraction, diffraction and interference of light is called a structural color. The structural color has the characteristics and advantages of high brightness and saturation and fastness. Therefore, how to prepare a large-area structural color photonic crystal pattern has attracted great attention in recent years. At present, the methods for obtaining a structural color pattern comprises self-assembly method, vertical deposition method, rotary coating method and an ink-jet printing technology. The self-assembly method needs to use patterned template substrate, colloidal particles are assembled on the template under geometric confinement, with difficulty in large-scale preparation, which limits the practical application of patterned photonic crystal. The vertical deposition method is to realize the assembly of latex particles based on reflux force and capillary force in evaporation process of the latex particles, and is the most commonly used method for preparing colloidal crystal so far. However, this method is still unable to meet the demand for large-area sample preparation, so that the rotary coating method is used for large-area preparation of the colloidal crystal. The rotary coating method needs to disperse mono-disperse latex samples into dispersion liquid with high viscosity, a redispersion process thereof is very complicated, and sometimes it is difficult to find a suitable dispersion system. The ink-jet printing technology is easier to realize direct writing of large-area complicated pattern and patterning of composite functional material, is simple and convenient in preparation and low in cost, and does not need to use a pre-patterned template. In addition, the structural color pattern printed by the ink-jet printing technology can enable ink to be uniformly deposited on surface of the substrate, so that the obtained large-area structural color pattern has uniform color.

For the preparation of the large-area structural color photonic crystal pattern by the ink-jet printing technology, two types of devices generally are used, one is a common ink-jet printer, and the other is a material ink-jet deposition apparatus. The former is cheap, PET is generally selected as the printing substrate, and ink materials comprise polymer microspheres (Journal of Materials Chemistry, 2009, 19 (31):5499-5502), $TiO_2$ (ACS Nano, 2016, 10 (3):3078-3086), etc. Compared with the common ink-jet printer, the material ink-jet deposition apparatus is expensive, which limits the application thereof. Song Yanlin, etc. print the polymer microspheres on a hydrophobic PDMS substrate by using material ink-jet deposition apparatus (Advanced Optical Materials, 2014, 2 (1):34-38). A "coffee ring" effect is suppressed by controlling the sliding three-phase contract line of droplets on surface of the substrate, and an assembly structure with a larger height-diameter ratio and close accumulation of nano-particles is prepared, thus obtaining an angle-independent structural color pattern.

Although the structural color pattern can be obtained by the two methods above, substrate materials required by the two methods are mostly plastic substrates and need to be preprocessed, and the second method device is expensive, which limits the use thereof. Therefore, it is still necessary to develop a method for printing a large-area structural color pattern on paper by using a common ink-jet printer. According to the characteristics of microspheres with a high refractive index, in the present invention, a pretty structural color can be obtained by assembly ordered in short range and disordered in long range, and the structural color pattern can be printed on various papers through a common commercial printer.

The structural color pattern can be applied to anti-counterfeiting. At present, a method for realizing anti-counterfeiting by structural color mainly comprises two types: one is to prepare a responsive polymer film by etching technology and realize anti-counterfeiting through external stimulation; and the other is to deposit mono-disperse nano-particles on preprocessed glass, polydimethylsiloxane and other substrate materials by ink-jet deposition apparatus. The former has a complicated preparation process, and the inside of the prepared anti-counterfeiting pattern is mobile phase, which limits the use thereof (Advanced Functional Materials, 2014, 24(41):6430-6438). The printing device used by the latter is expensive, the substrate materials need to be preprocessed, and in addition, the anti-counterfeiting are realized by changing the background or light source intensity (Chemistry—An Asian Journal, 2016, 11(19):2680-2685).

According to the present invention, the microspheres with high refractive index are used to print the structural color pattern through the ink-jet printing technology, the microspheres with different particle diameters have the same body color, inks containing microspheres with different particle diameters are used to print different color parts of the pattern, when the observation angle is close to the incident light angle, the structural color is bright and the pretty structural color pattern can be observed, and when the observation angle deviates from the incident light angle, the brightness of the structural color is reduced and the body color of the material is reflected, and the pattern is hidden at this time, so that the structural color pattern is hidden or displayed through the change of the observation angle only. Since no external stimulation is needed in a process of hiding and displaying the pattern and the structural color itself has no phase change, the anti-counterfeiting pattern has the advantages of simple preparation and strong practical durability.

SUMMARY OF THE INVENTION

The present invention is intended to provide a simple and universal method for preparing a large-area structural color pattern and an anti-counterfeiting method, a common ink-jet printer is used to obtain a large-area structural color pattern with different colors on paper without preprocessing, and when the angle of observation is changed, the anti-counterfeiting is realized by a change between body color and structural color. The method is low in cost, and the matrix material used in the method does not need to be preprocessed, and the printed pattern exists in a solid form, thus being convenient to use. In addition, an external force does not need to be applied on the pattern for realizing the anti-counterfeiting, and the deformation cannot occur because of a microstructure cannot be changed. Therefore, the method has a great practicability.

In order to solve the technical problems above, one technical solution used in the present invention is that: ink containing mono-disperse microspheres with a high refractive index is fed into an ink box, a pattern is designed through computer software, and the ink is uniformly deposited on paper by using an ink jet printer to obtain a large-area structural color pattern. The structural color pattern is hidden or displayed by changing an angle of observation. The realization process comprises the following steps of:

(1) preparing mono-disperse colloidal microspheres, mixing the mono-disperse colloidal microspheres, additive with high boiling point, ethanol, glycerol, surfactant, defoaming agent, adhesive, pH regulator and deionized water, and performing ultrasonic dispersion on the mixture to obtain an ink and feed it into ink box of an ink-jet printer;

(2) designing a pattern through computer software; and (3) using the ink prepared in step (1) to print the pattern designed in step (2) on paper through an ink-jet printing technology to obtain a large-area structural color pattern.

The additive with a high boiling point is organic solvent with boiling point greater than 180° C.

Further in the technical solution above, the mono-disperse submicron colloidal microspheres with high refractive index in the step (1) are microspheres with refractive index greater than 2, and are one of cadmium sulfide (CdS), cuprous oxide ($Cu_2O$), titanium dioxide ($TiO_2$), zinc sulfide (ZnS) and zinc oxide (ZnO).

Further in the technical solution above, the mono-disperse colloidal microspheres in step (1) have a particle diameter of 90 nm to 400 nm.

Further in the technical solution above, nano-microspheres with different particle diameters are respectively prepared into inks, and different parts of the pattern are printed with different inks.

Further in the technical solution above, when an angle of observation is close to an incident light angle, a bright structural color pattern can be observed, and when the angle of observation deviates from the incident light angle, the structural color pattern disappears.

Further in the technical solution above, in the ink obtained in step (1), a content of the mono-disperse colloidal microspheres is 5 wt % to 20 wt %, a content of the additive with high boiling point is 5 wt % to 15 wt %, a content of the ethanol is 8 wt % to 20 wt %, a content of the glycerol is 1 wt % to 5 wt %, a content of the surfactant is 2 wt % to 5 wt %, a content of the defoaming agent is 0.1 wt % to 0.2 wt %, a content of the adhesive is 1 wt % to 4 wt %, a content of the pH regulator is 2 wt % to 4 wt %, and the balance is the deionized water.

Further in the technical solution above, the additive with high boiling point in step (1) is ethylene glycol, diethylene glycol or formamide.

Further in the technical solution above, the surfactant in step (1) is OP-10 or polyvinylpyrrolidone.

Further in the technical solution above, the defoaming agent in step (1) is tributyl phosphate.

Further in the technical solution above, the adhesive in step (1) is one of polyvinyl alcohol, polyurethane resin and acrylic resin.

Further in the technical solution above, the pH regulator in step (1) is one of triethanolamine, diethanolamine and ethanolamine.

Further in the technical solution above, the paper in step (1) is one of coated paper, resin coated (RC) photo paper and high gloss photo paper.

Further in the technical solution above, the printer in step (3) is ink-jet printer.

Further in the technical solution above, the pattern is common pattern and quick-response matrix code designed through computer software.

Beneficial Effects of the Invention

The present invention uses a common ink-jet printer to uniformly deposite the inks containing the mono-disperse microspheres with different particle diameters on the paper, and nano-particles are arranged and assembled to obtain a micro-structure ordered in short range and disordered in long range. Through interaction of the micro-structure with light, a bright structural color is obtained, and when the angle of observation is changed, the brightness of the structural color is changed, so that the pattern is hidden or displayed, thus having a great practicability in anti-counterfeiting and information encryption. This method is low in cost, and the matrix material used does not need to be preprocessed, so that the method has a great practicability.

BRIEF DESCRIPTION OF THE DRAWINGS

FIGS. 1a, 1b and 1c illustrate respectively a digital photo, a scanning electron microscope image and a reflection spectrum image of a large-area red structural color pattern printed by ink-jet printing in example 1;

FIGS. 2a, 2b and 2c illustrate respectively a digital photo, a scanning electron microscope image and a reflection spectrum image of a large-area green structural color pattern printed by ink-jet printing in example 2;

FIG. 4 panel c and panel d illustrate digital photos of the quick-response matrix code when being displayed in example 4, a red QR code can be observed in FIG. 4 panel c, the rest is yellow; and a green QR code is observed in FIG. 4 panel d, and the rest is yellow.

DETAILED DESCRIPTION OF THE INVENTION

Figure 3A:
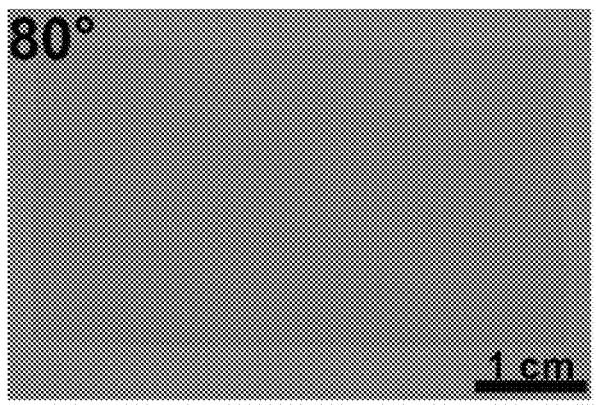
FIG. 3a illustrates a hidden digital photo of a pattern in example 3, and the whole pattern is all yellow.

The examples in the invention are described with reference to the drawings, so that the invention can be better understood by those skilled in the art, and the protection scope of the invention can be defined.

Example 1

A large-area red structural color pattern is obtained by ink-jet printing of CdS ink.

Firstly, mono-disperse CdS colloidal microspheres were prepared, and the detailed preparation method was as follows:

5 g of polyvinylpyrrolidone (PVP) powder was added into 150 mL of diethylene glycol, then cadmium nitrate and thiourea powder with equal amount of substance were added, wherein the amount of substance of the cadmium nitrate and the thiourea was 20 mmol, and then the mixture was stirred until all the powder was completely dissolved. The above solution was heated to 160° C. and thermal reaction for 5 h, then naturally cooled to a room temperature, and a product was centrifuged and then dried after washing with ethanol and water for 3 times. Mono-disperse CdS nano-particles with an average particle diameter of 335 nm were obtained.

A certain amount of the mono-disperse CdS microsphere powder obtained above was fully grinded, wherein a content of the mono-disperse CdS microspheres added was 12 wt %, a content of ethylene glycol was 5 wt %, a content of ethanol was 10 wt %, a content of glycerol was 5 wt %, a content of PVP was 2.7 wt %, a content of tributyl phosphate was 0.1 wt %, a content of polyvinyl alcohol was 1 wt %, a content of triethanolamine was 3 wt %, and the balance was deionized water. Ultrasonic processing was performed for 30 min to prepare uniformly dispersed ink.

The prepared ink is fed into an ink box, and the designed pattern is printed by an ink-jet printer, so that CdS nano-particles in the ink are uniformly deposited on high-gloss photo paper to obtain a micro-structure ordered in short range and disordered in long range, as shown in FIG. 1a, a large-area red structural color pattern is obtained.

Example 2

A large-area green structural color pattern is obtained by ink-jet printing of CdS ink.

Firstly, mono-disperse CdS colloidal microspheres were prepared, and the detailed preparation method was as follows:

5 g of polyvinylpyrrolidone (PVP) powder was added into 150 mL of diethylene glycol, then cadmium nitrate and thiourea powder with equal amount of substance were added, wherein the amount of substance of the cadmium nitrate and the thiourea was 15 mmol, and then the mixture was stirred until all the powder was completely dissolved. The above solution was heated to 162° C. and thermal reaction for 6 h, then naturally cooled to a room temperature, and a product was centrifuged and then dried after washing with ethanol and water for 3 times. Mono-disperse CdS nano-particles with an average particle diameter of 270 nm were obtained.

A certain amount of the mono-disperse CdS microsphere powder obtained above was fully grinded, wherein a content of the mono-disperse CdS colloidal microspheres added was 15 wt %, a content of ethylene glycol was 5 wt %, a content of ethanol was 10 wt %, a content of glycerol was 5 wt %, a content of PVP was 3 wt %, a content of tributyl phosphate was 0.1 wt %, a content of polyvinyl alcohol was 1.5 wt %, a content of triethanolamine was 3 wt %, and the balance was deionized water. Ultrasonic processing was performed for 30 min to prepare uniformly dispersed ink.

The prepared ink is fed into an ink box, and the designed pattern is printed by an ink-jet printer, so that CdS nano-particles in the ink are uniformly deposited on high-gloss photo paper, as shown in FIGS. 2a-2c, a large-area green structural color pattern is obtained.

Example 3

Preparation of a large-area structural color pattern, and its hide or display based on a structural color brightness change.

Firstly, mono-disperse CdS colloidal microspheres with different particle diameters were prepared, and the detailed preparation method was as follows:

5 g of polyvinylpyrrolidone (PVP) powder was added into 150 mL of diethylene glycol solution, then cadmium nitrate and thiourea powder with a molar ratio of 1 were added, and stirring was performed until all the powder was completely dissolved. The above solution was heated to 150-160° C. and thermal reaction for 5 h, then naturally cooled to a room temperature, and a product was centrifuged and washed with ethanol and water for 3 times, then was dried and grinded to obtain CdS powder with particle diameter of 270 nm.

4.5 g of polyvinylpyrrolidone (PVP) powder was added into 150 mL of diethylene glycol solution, then cadmium nitrate and thiourea powder with a molar ratio of 1 were added, and stirring was performed until all the powder was completely dissolved. The above solution was heated to 150-160° C. and thermal reaction for 5 h, then naturally cooled to a room temperature, and a product was centrifuged and washed with ethanol and water for 3 times then was dried and grinded to obtain CdS powder with particle diameter of 290 nm.

5 g of polyvinylpyrrolidone (PVP) powder was added into 150 mL of diethylene glycol solution, then cadmium nitrate and thiourea powder with a molar ratio of 1 were added, and stirring was performed until all the powder was completely dissolved. The above solution was heated to 150-160° C. and thermal reaction for 5 h, then naturally cooled to a room temperature, and a product was centrifuged and washed with ethanol and water for 3 times, then was dried and grinded to obtain CdS powder with particle diameter of 335 nm.

A certain amount of mono-disperse CdS microsphere powder with the three particle diameters above was fully grinded respectively for preparing inks respectively to print different parts of the pattern. For the preparation of the ink, a content of mono-disperse colloidal microspheres added was 15 wt %, a content of ethylene glycol was 5 wt %, a content of ethanol was 10 wt %, a content of glycerol was 5 wt %, a content of PVP was 3 wt %, a content of tributyl phosphate was 0.1 wt %, a content of polyvinyl alcohol was 1.5 wt %, a content of triethanolamine was 3 wt %, and the balance was deionized water. Ultrasonic processing was performed for 30 min to prepare uniformly dispersed ink. Three inks were fed into three ink boxes respectively. A pattern with two butterflies was designed through computer software, and a computer was connected with a printer.

Figure 3B:
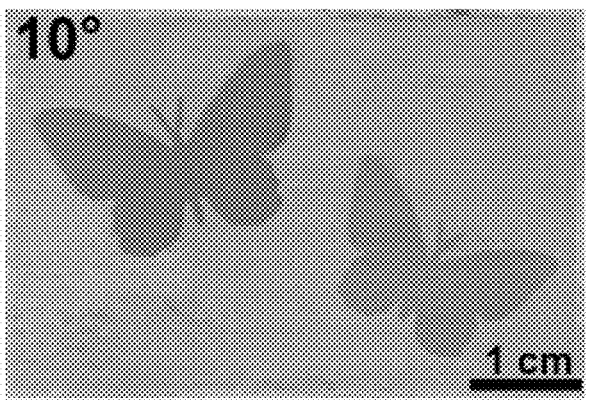
FIG. 3b illustrates a displayed digital photo of the pattern in example 3, the butterfly in the upper left corner is red, the butterfly in the lower right corner is green, and the rest is yellow.

The ink is printed on high-gloss photographic paper by using an ink-jet printer, an experimental condition is a room temperature, and a large-area structural color pattern with different colors is finally obtained. As shown in FIGS. 3a and 3b, (wherein a background color is printed with ink prepared by CdS nano-particles with a particle diameter of 290 nm, and an orange-yellow structural color can be obtained), when an angle of observation is closer to vertical incidence, a contrast ratio of structural colors of two butterflies to a structural color of a background is more obvious, and a pattern with three pretty structural colors can be observed; and when the angle of observation deviates from a vertical incident angle (>30), the structural colors of the butterflies and the background are covered by the body colors, while the body colors of the butterflies and the background are similar and are all yellow. At the moment, the contrast ratio of colors of the butterflies to the background is low, and the butterflies are hidden in a background pattern.

Example 4

Anti-counterfeiting application of a quick-response matrix code based on a structural color brightness change is provided.

Figure 4:
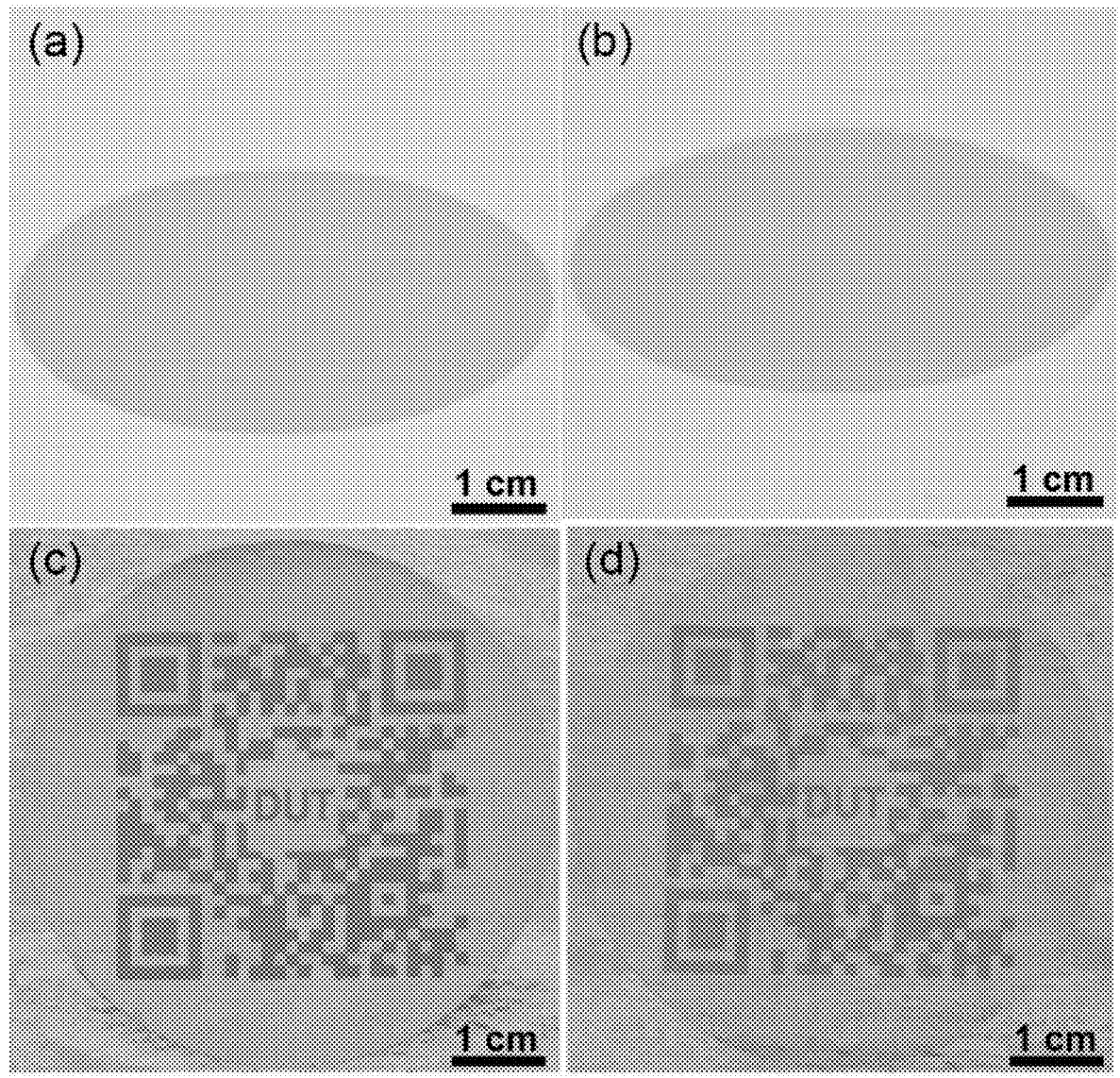
FIG. 4 panel a and panel b illustrate digital photos of a quick-response matrix code when being hidden in example 4, the whole pattern is all yellow.

The ink in the third example is used, a quick-response matrix code with a background is generated through computer software design, and the ink is printed on high-gloss photographic paper by using an ink-jet printer to obtain a large-area pattern with two structural colors. As shown in FIG. 4, when an angle of observation is closer to vertical incidence, a contrast of colors of a matrix code to a background is more obvious, two pretty structural colors can be observed, while the matrix code can be scanned and a link is obtained. A quick-response matrix code which can be hidden or displayed is obtained, and when the pretty structural color can be observed, the matrix code can be scanned and the link is obtained; and when the angle of observation deviates from the vertical incident angle (>30), the structural colors of the matrix code and the background are covered by the body colors of the matrix code and the background, while the body colors of the matrix code and the background are both yellow. At the moment, the matrix code is hidden in the background pattern and cannot be observed, and the matrix code cannot be scanned due to the low contrast of the matrix code and the background.

Example 5

A large-area red structural color pattern is obtained by ink-jet printing of ZnS ink.

Firstly, mono-disperse ZnS colloidal microspheres were prepared, and the specific preparation method was as follows:

A certain amount of polyvinylpyrrolidone was placed in a 250 mL three-necked flask, 75 mL of deionized water was added, and slow stirring and heating were performed. When a temperature reached 80° C., 0.01 mol of thioacetamide was added into a system, and stirred for 10 min for even mixing, 100 μL of concentrated nitric acid was added, then 0.02 mol of $Zn(NO_3)_2 \cdot 6H_2O$ was prepared into 5 mL of water solution after the reaction for 10 min, and added into a three-necked flask, a rotation speed was immediately increased to mix the mixture evenly, the rotation speed was reduced to 500 rpm after a few minutes, and a reflux reaction was performed for 3 h at 75° C. A product obtained was washed with deionized water for 3 times to 4 times to obtain mono-disperse ZnS nano-particles with an average particle diameter of 230 nm. Centrifugation and vacuum drying were performed for later use.

A certain amount of the mono-disperse ZnS microsphere powder was fully grinded, wherein a content of mono-disperse colloidal microspheres added was 10 wt %, a content of formamide was 10 wt %, a content of ethanol was 10 wt %, a content of glycerol was 2 wt %, a content of PVP was 2 wt %, a content of tributyl phosphate was 0.1 wt %, a content of polyvinyl alcohol was 1 wt %, a content of triethanolamine was 2 wt %, and the balance was deionized water. Ultrasonic processing was performed for 30 min to prepare evenly dispersed ink.

The prepared ink is fed into an ink box, and the designed pattern is printed by using an ink-jet printer, so that ZnS nano-particles in the ink are evenly deposited on RC photographic paper, and a large-area red structural color pattern is finally obtained.

The invention claimed is:

1. A method for preparing a structural chromogenic pattern by ink-jet printing, comprising:
    (1) preparing a plurality of inks including a first ink and a second ink, each ink containing mono-disperse colloidal microspheres having a refractive index greater than 2, wherein the first ink contains a first mono-disperse colloidal microspheres having a first average particle diameter, and the second ink contains a second mono-disperse colloidal microspheres having a second average particle diameter, and the first average particle diameter differs from the second average particle diameter, wherein the first mono-disperse colloidal microspheres and the second mono-disperse colloidal microspheres are made of a same material;
    (2) designing a pattern having two or more different colors through computer software; and
    (3) using the plurality of inks prepared in step (1) to print the pattern designed in step (2) on paper through ink-jet printing technology to obtain the structural chromogenic pattern.

2. The method according to claim 1, wherein the first mono-disperse colloidal microspheres and the second mono-disperse colloidal microspheres are made of cadmium sulfide, cuprous oxide, titanium dioxide, zinc sulfide, or zinc oxide, and the first average particle diameter and the second average particle diameter are in a range of 90 nm to 400 nm.

3. The method according to claim 1, wherein, in the first ink or the second ink, a content of the mono-disperse colloidal microspheres is 5 wt % to 20 wt %, a content of an additive is 5 wt % to 15 wt %, a content of ethanol is 8 wt % to 20 wt %, a content of the glycerol is 1 wt % to 5 wt %, a content of a surfactant is 2 wt % to 5 wt %, a content of a defoaming agent is 0.1 wt % to 0.2 wt %, a content of an adhesive is 1 wt % to 4 wt %, a content of a pH regulator is 2 wt % to 4 wt %, and the balance is the deionized water, wherein the additive is an organic solvent having a boiling point higher than 180° C.

4. The method according to claim 3, wherein the additive is ethylene glycol, diethylene glycol, or formamide.

5. The method according to claim 3, wherein the surfactant is OP-10 or polyvinylpyrrolidone.

6. The method according to claim 3, wherein the defoaming agent is tributyl phosphate.

7. The method according to claim 3, wherein the adhesive is polyvinyl alcohol, polyurethane resin, or acrylic resin.

8. The method according to claim 3, wherein the pH regulator is triethanolamine, diethanolamine, or ethanolamine.

9. The method according to claim 3, wherein the paper is coated paper, resin coated photo paper, and high gloss photographic paper.

10. The large-area structural chromogenic pattern on paper obtained by the method according to claim 1.

11. A method for anti-counterfeiting, comprising:
    printing the structural chromogenic pattern according to the method of claim 1; and
    viewing the structural chromogenic pattern with a vertical incident angle of less than or equal to 30°.

12. The method for anti-counterfeiting according to claim 11, wherein the structural chromogenic pattern is a matrix code and the observing step is carrying out using a scanning device.

13. The method according to claim 1, wherein the first ink is prepared by:
mixing the first mono-disperse colloidal microspheres, an additive that is an organic solvent with a boiling point greater than 180° C., ethanol, glycerol, surfactant, a defoaming agent, an adhesive, a pH regulator and deionized water to form a mixture; and
performing ultrasonic dispersion on the mixture to obtain a stable solution as the first ink.

* * * * *